United States Patent [19]

McCoy et al.

[11] Patent Number: 5,354,347
[45] Date of Patent: Oct. 11, 1994

[54] VACUUM CLEANER UTILIZING WATER TO CAPTURE DIRT AND DEBRIS

[75] Inventors: Stephen T. McCoy, Missouri City; Jack G. Clark, Jr., Houston, both of Tex.

[73] Assignee: E. B. S. Equipment Broker Services, Inc., Houston, Tex.

[21] Appl. No.: 38,896

[22] Filed: Mar. 29, 1993

[51] Int. Cl.$^5$ ............................................. B01D 47/00
[52] U.S. Cl. ........................................ 55/245; 15/353; 55/248; 55/255; 55/256; 55/257.3
[58] Field of Search ............... 55/245, 248, 255, 256, 55/257.3; 95/226, 260; 15/353, 366

[56] References Cited

U.S. PATENT DOCUMENTS

| | | | |
|---|---|---|---|
| 1,992,025 | 2/1935 | Donaldson | 55/245 |
| 2,151,593 | 3/1939 | Glanzer | 55/245 |
| 2,247,103 | 6/1941 | Summerson | 55/255 |
| 2,474,746 | 6/1949 | Lopez et al. | 55/248 |
| 3,618,299 | 4/1969 | Vincent | 55/260 |
| 4,078,908 | 3/1978 | Blackman | 55/237 |
| 4,145,198 | 3/1979 | Laule | 55/439 |
| 4,251,241 | 2/1981 | Bothun | 15/353 |
| 4,288,885 | 9/1981 | Parise | 15/321 |
| 4,547,206 | 10/1985 | Sovis et al. | 15/353 |
| 4,640,697 | 2/1987 | Erickson, Jr. | 55/248 |
| 4,776,058 | 9/1988 | Garner et al. | 15/320 |
| 4,798,613 | 1/1989 | Hetherington et al. | 95/267 |
| 4,809,396 | 3/1989 | Houser | 15/353 |
| 4,824,333 | 4/1989 | Erickson, Jr. | 417/360 |
| 4,874,404 | 10/1989 | Boswell | 95/226 |
| 5,076,819 | 12/1991 | Sharrow | 95/226 |
| 5,208,940 | 5/1993 | London et al. | 15/353 |
| 5,210,902 | 5/1993 | Lee et al. | 15/353 |
| 5,237,719 | 8/1993 | Dwyer, Jr. et al. | 15/353 |

FOREIGN PATENT DOCUMENTS 131435  1/1933  Australia .............................. 55/255

Primary Examiner—James C. Housel
Assistant Examiner—Laura E. Collins
Attorney, Agent, or Firm—Litman, McMahon & Brown

[57] ABSTRACT

A vacuum system which uses water as a filtration medium to effectively capture dirt and dust particles. The vacuum system uses a canister or tank, which can be placed on a wheeled mobile frame for mobility. Within the tank, a removeable insert includes a number of equally spaced annular plates with a first of the annular plates fitting snugly against the outside wall of the tank and the next plate fitting snugly against the outside wall of a central cylindrical column. The plates then continue to alternate from outside wall of the tank to the outside wall of the column to form alternating gaps and, thus, a serpentine airflow path. The bottom portion of the tank is filled with a quantity of water sufficient to cover the bottom of an air intake port. A blower draws air, along with accompanying debris, from the intake port through the water. The water filtered air, which now contains a considerable quantity of entrained water, is then drawn through the serpentine path wherein the resulting varying air speeds, along with the eddy currents generated by this path, effectively remove the entrained water from the air.

6 Claims, 2 Drawing Sheets

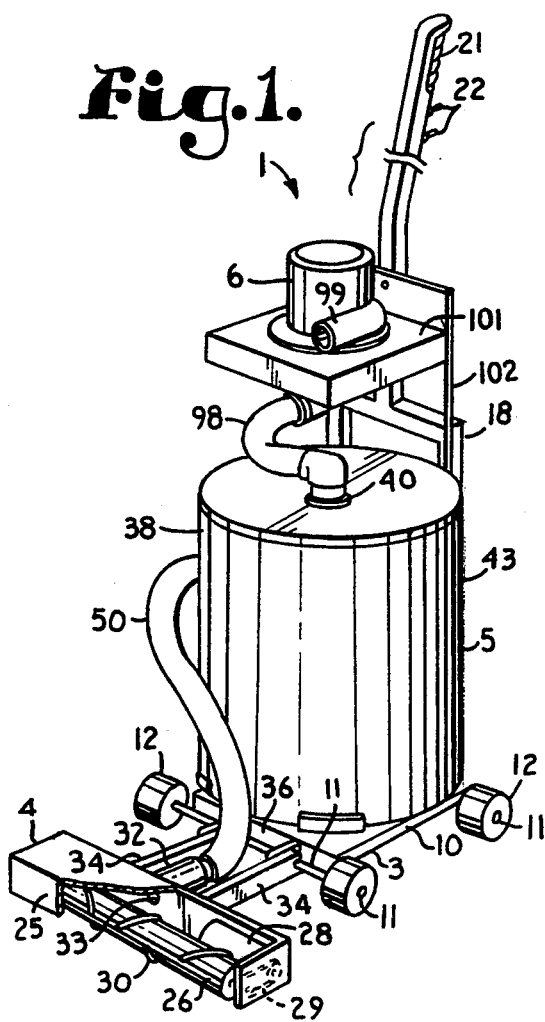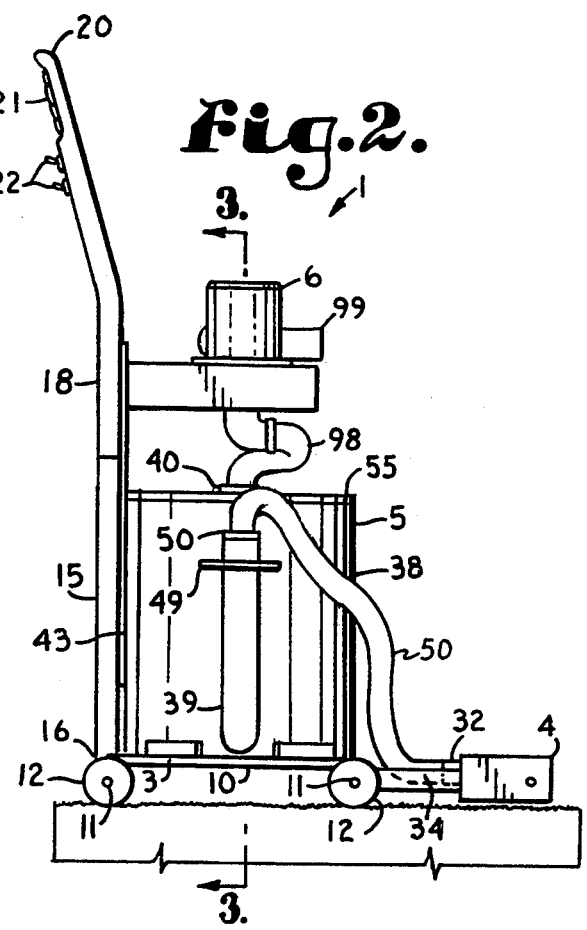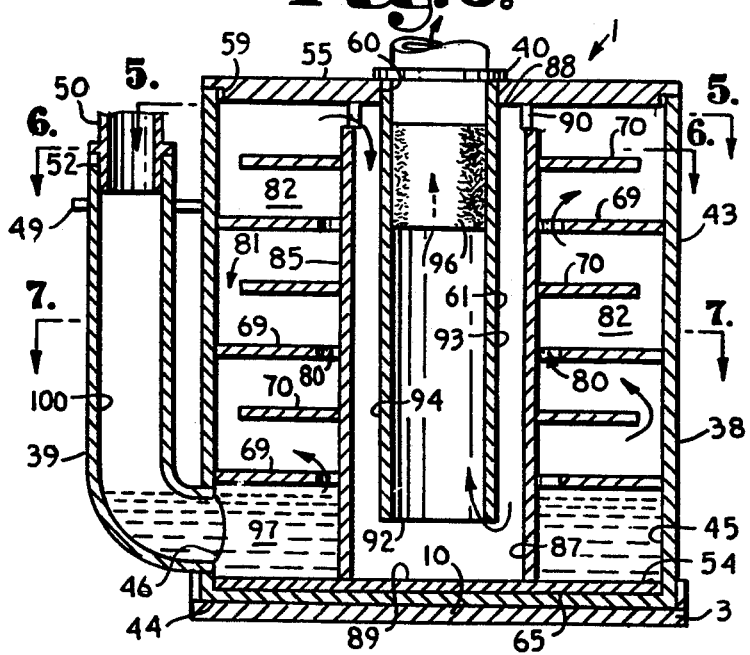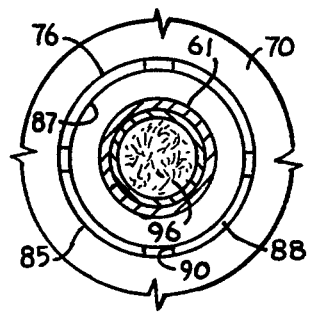

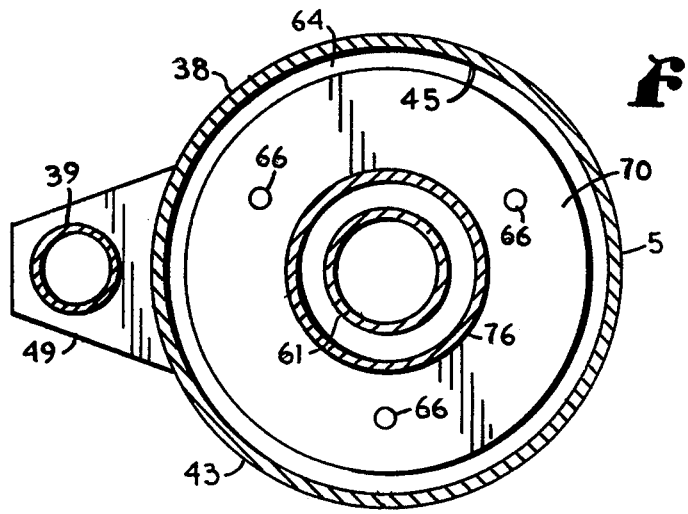
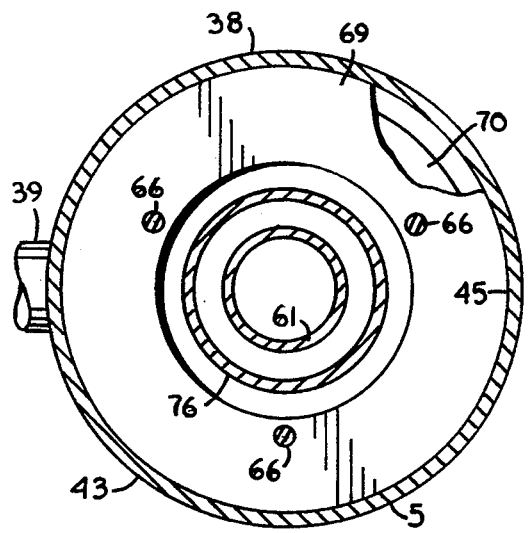
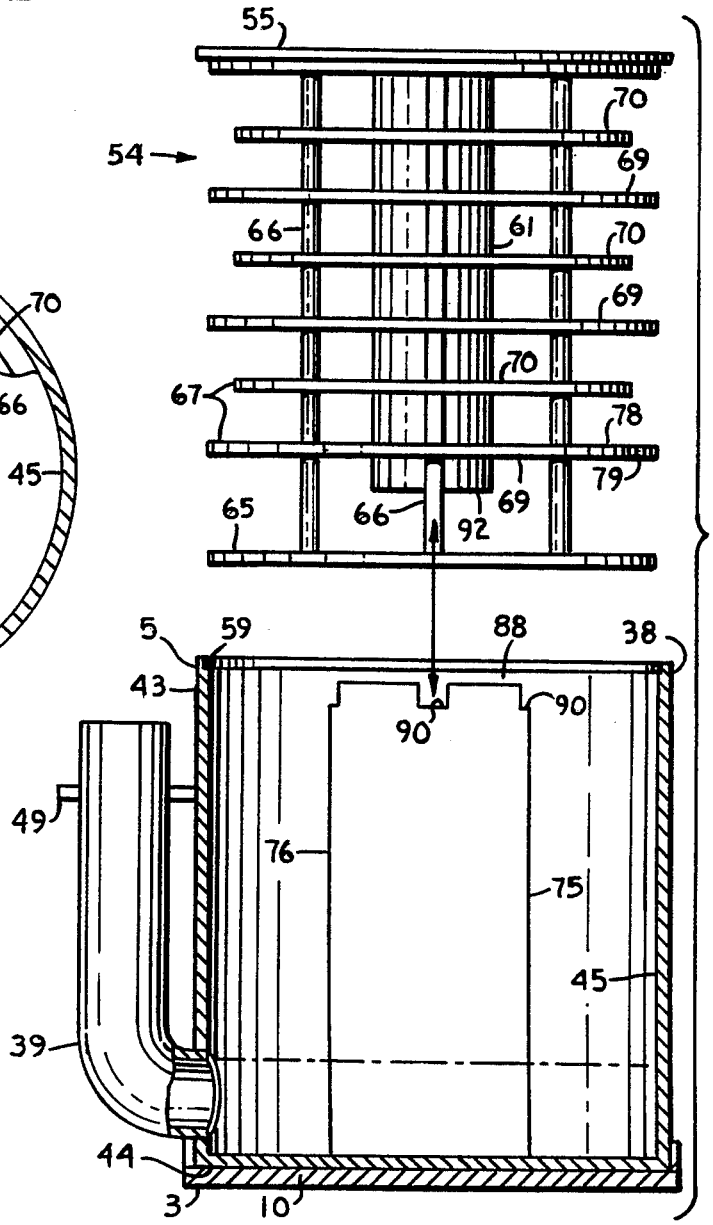

VACUUM CLEANER UTILIZING WATER TO CAPTURE DIRT AND DEBRIS

BACKGROUND OF THE INVENTION

The present invention is directed to a vacuum cleaner apparatus having a chamber partially filled with water through which dirt and debris is drawn by the vacuum so that the dirt and debris are retained in the water. A series of baffles are utilized to remove water from the air prior to where the air exits the chamber.

Conventional vacuum cleaners, wherein air is drawn by a fan so as to produce a vacuum which lifts dirt, dust and the like from a floor being swept thereby, typically incorporate a discharge bag or similar structure through which the air exits, leaving the dirt and dust within the bag. In particular, the bag is porous, having openings that are sufficiently large to allow air to pass therethrough, but sufficiently small to capture much of the dirt and dust. Unfortunately, a substantial amount of the debris swept into such vacuum cleaners is of a small enough diameter to also pass through the openings in the bag. For example, typical bag filter vacuum cleaners capture only particles which are ten microns or greater in size. Consequently, use of such cleaners effectively results in the spraying of all dust particles smaller than ten microns back into the air. This is a very undesirable side effect for those who suffer from dust allergies since they are essentially sprayed with the dust to which they are allergic.

Because the bag type vacuum cleaners effectively recycle much of the fine dust back to the room from which it is taken and because such cleaners present significant problems to persons suffering from dust allergies, prior art inventors have attempted to produce machines which are more effective at removing smaller microscopic dust and dirt particles.

In particular, a number of companies have produced various water containment types of vacuum cleaners wherein the dust and dirt vacuumed up by the cleaner are directed toward or drawn through a water filled chamber. Watervacs or aquavacs of this type have effectively suffered from many different problems.

In many such units, the intake air, along with the dust and dirt particles, is merely directed at the water surface, with the interaction between air and water capturing much of the dirt and dust in the water. However, as the relatively high speed air stream strikes the water surface, much of the air, along with some of the dirt and dust, is merely reflected upward and drawn out the exhaust stream. Thus, just as in the bag filter vacuums, many microscopic dust and dirt particles are effectively sprayed back into the room being cleaned.

In water vacuum systems which draw the intake air directly through the water chamber, one problem is that motors used to drive the blowers drawing the vacuum have generally not been powerful enough. This is due to the basic design of prior art water vacuums, i.e. any blower having a high vacuum efficiency and/or high air flow rate therethrough also has a tendency to suck the water from the water chamber through the blower. This can be highly detrimental to the blower and motor, and can also result in spraying the collected dust and dirt along with the water back into the room being cleaned.

A second problem with the prior art structures is that the blowers and motors have often been physically located in a position within the vacuum in which they are susceptible to having water sloshed therein. This is particularly true when the vacuum is rapidly moved back and forth over the surface being cleaned.

A third problem is that the prior art has utilized a complicated and, therefore, very expensive type of system to avoid the problem of entrainment of water into the blower and motor. The resulting costs of such systems has effectively priced vacuum cleaners of this type out of the financial reach of many individuals.

Finally, many of the prior art water or aquavacs are relatively hard to clean. The blowers and motors are often permanently attached to parts that need frequent cleaning. This attachment, due to the sensitivity of motor parts, in particular, to moisture, effectively prevents spraying or emersion of the part to be cleaned. Furthermore, the systems are often cumbersome to disassemble, making it difficult to empty and clean the water chamber.

Consequently, a need still exists for a relatively low cost water collection vacuum cleaner that can utilize a relatively powerful motor driving a high speed blower which produce a high intake vacuum and air flow through the system. It is desirable that dirt and dust be effectively collected and contained in a water chamber with relatively little bypass of microscopic dust particles. It is also desirable that the entire system be relatively simple in design and easy to clean. Finally it is extremely desirable for the system to be relatively inexpensive so as to be affordable by most households.

SUMMARY OF THE INVENTION

The present invention is a vacuum system which uses water as a filtration medium to effectively capture dirt and dust particles down to at least three to five microns in size. The vacuum system uses a canister or tank, which can be placed on a wheeled mobile frame for mobility or used as a central unit. The mobile frame can be connected to a conventional upright vacuum handle, which can be locked in either an upright position or released to pivot to a more comfortable use position.

A blower unit, driven by a powerful, high speed motor, is mounted on a vertical support, which, in turn, is attached to the mobile frame. The motor and blower unit are thus positioned outside of the tank, and, therefore, are not susceptible to having water sloshed thereon.

Within the tank, a centrally located upstanding cylindrical column is sealably attached to the bottom of the tank. The column is open at the top and incorporates a plurality of cutouts about the top thereof. An elongate air intake pipe has one end connected to the tank near the bottom thereof, and the other end is connectable to a vacuum hose. A beater bar head is connected to the front of the mobile frame, and a hose is alternatively attached to the beater bar assembly, wherein the system operates as an upright vacuum, or alternatively, the hose can be used separately with other attachments, allowing the vacuum to perform various cleaning functions such as are performed by a conventional canister-type vacuum.

A tank insert has a base plate and a top plate or lid connected by a plurality of radially and circumferentially spaced support and positioning posts. A number of annular plates are equally spaced between the bottom and the top plate, and are attached to the positioning posts. The annular plates are of two types, with the types alternating from top to bottom of the insert.

When the vacuum system is assembled, the insert is positioned inside the tank, with a first of the annular plates fitting snugly against the outside wall of the tank with an opening at the outside wall of the column. The next plate fits snugly against the outside wall of the cylindrical column in the tank, and has an opening at the outside wall of the tank. The openings then continue to alternate from outside wall of the tank to the outside wall of the column.

A central riser tube in the insert is positioned inside the cylindrical column and the cutouts in the column allow air to communicate from the tank to the inside of the column. A hose is connected between the top of the central riser tube and the blower. Once assembled, the bottom portion of the tank is filled with a quantity of water sufficient to cover the bottom of the intake pipe. Thus, when the high speed motor is started, the blower draws air, along with accompanying dust and dirt particles, from the intake hose through the water. The water filtered air, which now contains a considerable quantity of entrained water, is then drawn through the openings around the annular plates in a serpentine path. The resulting varying air speeds due to moving between relatively smaller and larger cross-sectional regions along the path, along with the eddy currents generated by this path, effectively remove the entrained water from the air, allowing it to drip back into the bottom of the tank.

Once past the top annular plate, the air is drawn through the cutouts, down the inside of the cylindrical column, and up the central riser tube to the blower. A filter within the central riser tube effectively filters out any remaining dust particles so that air exhausted from the vacuum is substantially free of even microscopic dust and dirt particles.

OBJECTS AND ADVANTAGES OF THE INVENTION

Therefore, the objects of the present invention are: to provide a vacuum cleaner that uses a relatively high speed motor and blower to pick up dirt and debris and draw it through a water tank such that the dirt and debris is captured by the water; to provide such a cleaner wherein the dirt and debris as well as the water entrained in the air stream passing through the cleaner are affectively removed therefrom before the air stream exhausts from the vacuum cleaner; to provide such a cleaner wherein the cleaner can be used as an upright vacuum and moved back and forth rapidly across a floor without sloshing water into the exit air stream or the motor and blower; to provide such a cleaner wherein the collection chamber can be quite easily removed, opened and cleaned; to provide such a cleaner having a series of parallel annular plates arranged to form a serpentine airflow path through which the air stream passes subsequent to passing through the water, the plates functioning so as to cause water droplets entrained in the air stream to be removed therefrom; to provide such a cleaner which is relatively easy to disassemble for cleaning the interior thereof; to provide such a cleaner which is relatively inexpensive to produce; and to provide a cleaner which is relatively very easy to use, simple to manufacture and which is particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a vacuum cleaner in accordance with the present invention.

FIG. 2 is a side elevational view of the vacuum cleaner.

FIG. 3 is an enlarged and fragmentary cross sectional view of the vacuum cleaner, illustrating a dirt collecting water chamber thereof and an entrained water removal apparatus thereof, taken along line 3—3 of FIG. 2.

FIG. 4 is an enlarged, fragmentary and exploded side elevational view of the cleaner, with portions broken away to show interior detail thereof.

FIG. 5 is an enlarged and fragmentary cross sectional view of the cleaner, taken along line 5—5 of FIG. 3.

FIG. 6 is an enlarged and fragmentary cross sectional view of the cleaner, taken along line 6—6 of FIG. 3.

FIG. 7 is an enlarged and fragmentary cross sectional view of the cleaner, taken along line 7—7 of FIG. 3.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a vacuum cleaner in accordance with the present invention. The vacuum cleaner 1 generally includes a mobile frame 3, a beater bar head 4, a dirt collection apparatus 5 and a motor and blower assembly 6.

The frame 3 comprises a platform 10 supported by a pair of axles 11 upon which are mounted rotatable wheels 12 at opposite ends thereof. A handle frame 15 is pivotally attached to the rear of the platform 10 by a hinge 16. The handle frame 15 includes two lower fork members 18 connected by a T member 19 and having an upper distal end 20 having a control hand hold 21 and operating switches 22 located thereby. The handle frame 15 can be locked in an upright position as shown in FIG. 2 or released to allow pivoting about the hinge 16 to a more comfortable position for upright vacuuming use by a latch mechanism (not shown, but of a type conventionally used in upright cleaners).

The beater head 4 is pivotally attached to the front of the frame 3. The beater head 4 includes a rectangular box 25 having a lower side that is at least partially open. Pivotally mounted in the box 25 so as to partially extend below the box 25 is a beater bar 26. The bar 26 is rotatable about an elongate axis thereof under control of a motor 28 connected to the bar 26 by a drive belt 29. The motor 28 drives the bar 26 when the cleaner is turned on by use of the switches 22. Helical flighting 30 on the bar 26 engages, beats and urges debris to the middle of the beater head 4. A hose nipple 32 connected to the rear of the box 25 and flow connects with an aperture 33 in the rear of the box 25. A pair of supports 34 are attached to and extend rearwardly from the box 25. The rear of the supports 34 are pivotable mounted on the front axle 11. A stop 36 limits rotation of the head 4 relative to the frame 3.

The dirt collection apparatus 5 includes a tank 38 having an air inlet pipe 39 and an exhaust nozzle 40. The tank 38 is generally cylindrical in shape with a circular side wall 43 and a floor 44 forming an integral cylindrically shaped and water holding basin 45. A port 46 near the lower end of the sidewall 43 flow connects with the pipe 39. The pipe 39 is elongate and extends to near the top of the tank 38 where the pipe 39 is secured to the sidewall 43 by a brace 49. A hose 50 flows connects between the pipe 39 and the hose nipple 32. The hose 50 includes a quick connect fitting 52 that mates with the pipe 39 to allow a user to quickly connect and disconnect the hose 50 relative to the pipe 39.

The tank 38 has a flow control insert 54 attached to a lid 55 thereof. The insert 54 helps to control and direct air flow through the tank 38.

The lid 55 is easily removable from the tank 38 and sealably joins with an upper end of the sidewall 43 whereat a seal 59 helps prevent leakage therebetween, when the lid 55 is positioned on the sidewall 43. The only opening 60 in the lid 55 is an axially aligned, central and circular opening which receives a depending riser tube 61 which is sealably joined to the lid 55 and the nozzle 40 so as to flow connect through the riser tube 61 between the interior of the tank 38 and the outlet of the nozzle 40.

The insert 54 includes a base plate 65 three support and positioning posts 66 and six annular shaped plates 67. The base plate 65 is a circular, relatively thin and planar surfaced member having a diameter slightly smaller than the interior diameter of the tank basin 45. The support and positioning posts 66 are radially and circumferentially spaced from each other and are fixedly attached at opposite ends thereof to the top of the base plate 65 and the bottom of the lid 55.

The annular plates 67 are of two types, in particular first plate members 69 and second plate members 70 which are alternatively fixed to and positioned at generally equally spaced locations along the posts 66, so that the posts 66 support the plates 67. While each of the plates 67 have approximately the same cross-sectional area, the inner and outer diameters of the plate members 69 are both greater than that of the plate members 70. In particular, the outer edge of the plate members 69 have a diameter slightly smaller than an interior surface 73 of the tank basin 45, so that the plate members 69 fit slideably but relatively snugly against the interior surface 73 of the sidewall, 43 when the insert 54 is within the tank 38. The plate members 70 have both smaller inner and outer diameters than the plate members 69. The inner surface of the plate members 70 slideably but snugly abut against an outer surface 75 of an upstanding column 76. Each of the annular plates 67 has generally planar upper and lower surfaces 78 and 79, respectively, which are normally horizontally aligned during use of the cleaner 1.

Because of the configuration and size of the plate members 69, there is a generally annular shaped passage 80 formed between the inner edge of each plate 69 and the column 76. Likewise a generally annular shaped passage 81 is formed between the outer edge of each plate member 70 and the tank sidewall inner surface 73. When the insert 54 is positioned within the tank 38, as shown in FIG. 3, the passages 80 and 81 combine with open regions 82 between the plate members 69 and 70 to firm a respective serpentine path 85, as indicated by the flow arrows. The serpentine path 85 includes a series of alternative smaller and larger cross-sections wherein the open regions 82 represent larger cross-sectional areas and the passages 80 and 81 represent smaller cross-sectional areas. The serpentine path 85, with its varying cross-sectional areas, tends to allow entrained moisture droplets to drop out of air passing through the region 82 which droplets tend to coalesce on the top surface of the plates 67 and then flow downward to the water holding portion of the basin 45 due to gravity.

The column 76 is a cylindrically shaped structure having the outer surface 75 and an inner surface 87. The column 76 is fixedly and sealably attached at the bottom thereof to the tank floor 44 so as to be centrally located with respect to the basin 45 and so that the central axis thereof extends perpendicular to the floor 44. The column 76 has a circular floor 89 at the base thereof to collect moisture or debris. When the insert 54 is positioned in the tank 38, an upper edge 88 of the column 76 abuts against and supports the lid 55. A series of cut outs 90 at the upper end of the column 76 provide a passage flow connecting the inner and outer sides 87 and 76, respectively, of the top of the column 87 so as to flow connect with the serpentine path 85.

The riser tube 61 is sealably attached to the lid 55 at the upper end thereof. The tube 61 is shorter than the height of the tank 38 and, therefore, a bottom 92 of the tube 61 is spaced from the floor 89. The outer diameter of the tube 61 is substantially smaller than the inner diameter of the column 76 so that an outer surface 93 of the riser tube 61 is substantially spaced from the column inner surface 87 so as to form an annular flow passage 94 therebetween flow connecting with the cutouts 90 at one end and the interior of the riser tube 61 at the other end. Removably mounted in the tube 61 near the top thereof is a mesh filter element 96. The element 96 is slidably received in the riser tube 61 from the bottom thereof and snugly held therein from the upper side thereof by the nozzle 40, when the cleaner 1 is in use such that air passing through the riser tube 61 must pass through the element 96.

The riser tube 61 is flow connected to the blower assembly 6 by a hose 98 at the removeable nozzle 40. The hose 90 flow-connects to the blower 6 which is supported by a shelf 101 mounted by legs 102 on the mobile frame 3. Air exits the blower 6 during use through an exit nozzle 99. The blower 6 is preferably a relatively high speed unit creating a substantial vacuum head within the cleaner 1, especially at the beaterhead 4.

In use, the cleaner 1 is assembled as shown in FIGS. 1 through 3. Water 97 is placed in the tank 38 through the tube 39 to a preselected level near the lowest annular plate 67 and in the region radially outside the column 76. When the blower 6 is activated by the switches 22, air is drawn through the blower 6 and discharged through the nozzle 99. This in turn creates a vacuum in a pathway 100 that traverses the interior of the hose 98, the interior tank 38, the hose 50 and subsequently through the beater head 4. This, in turn, draws additional air, as well as dirt and other debris encountered by the beater head 4, through the vacuum pathway 100.

When air with debris therein enters the tank 38 through the intake pipe 39, the air passes through the water 97 which captures most of the debris contained in the air stream, especially small particles which frequently fail to be captured by vacuum cleaners of the prior art.

The air, after passing through the water 97, follows the serpentine pathway 85 through the insert 54, in the manner indicated by the arrows in FIG. 3. While the air is in the pathway 85, a substantial amount of the water 97 entrained with the air falls or collects on the plates 67 and flows by gravity back to the site of the main body of water 97 below the lowest annular plate 67 in the basin 45. The air then passes sequentially through the cutouts 90, the passage 94, the riser tube 61 including through the filter element 96, the hose 98 and finally the blower 6. The air exits the blower nozzle 99 substantially clean and free of contaminating solid debris. The handle assembly 15 and the beater 4 allow the cleaner 1 to be used in the manner of a conventional upright vacuum. Alternatively, the hose 50 can be removed from the connection 32 and attached to other brushes or implements (not shown) wherein the cleaner 1 is usable in the manner of a typical water filtered canister vacuum.

The cleaner 1 is relatively easy to clean. In particular, the hoses 98 and 50 are disconnected from the collection apparatus 5 after which the apparatus 5 is lifted from the frame 3. The lid 55 with the attached insert 54 is removed and the water 97 with the debris therein is poured from the tank 38. The apparatus 5 may then be rinsed and the basin 45 refilled to the appropriate level with clean water through the intake pipe 39. The filter element 96 may be manually pushed out the bottom of the riser tube 61, washed, dried and replaced.

It is foreseen that the vacuum system of the present invention can be used as a central type vacuum wherein hoses connect a central unit with remote air intake means, such as a beater bar or other attachments.

It is to be understood that while certain forms of the present invention have been illustrated and described herein, it is not to be limited to the specific forms or arrangement of parts described and shown.

What is claimed and desired to be secured by Letters Patent is as follows:

1. A vacuum cleaner comprising:
   (a) blower means for drawing a vacuum;
   (b) air intake means;
   (c) debris collection means flow connected with said air intake means and said blower means comprising:
      (i) cylindrical tank means having an output port flow connected to said blower means and an intake port flow connected to said air intake means, said tank means including a water basin wherein said intake means is submerged under water within said water basin such that substantially all intake air is directed through said water and a substantial portion of any accompanying debris is captured by said water, said tank means further including an axially aligned central column sealably joined with a bottom of said tank means and surrounded by said water basin; and
      (ii) flow control means positionable within said tank means above said water basin, said flow control means directing airflow from the surface of said water through a serpentine path toward said output port whereby water entrained in said airflow is substantially removed therefrom, said flow control means comprising insert means adapted to be removably placed within said tank means, said insert means comprising a series of generally parallel annular plates positioned about said central column and spaced longitudinally along said tank means; said plates comprising first and second plates, the first plate having an outer diameter slightly smaller than the inside diameter of said tank means so as to snugly fit thereagainst and an inside diameter substantially larger than the outside diameter of said central column to leave a first gap therebetween; and the second plate having an inside diameter slightly larger than the outside diameter of said central column so as to snugly fit thereagainst and an outside diameter substantially smaller than the inside diameter of said tank means to leave a second gap therebetween; said plates being vertically spaced and arranged on said insert such that the first and second plates alternate along the longitudinal axis of said tank means such that said first and second gaps and the spacing between said plates forms said serpentine path.

2. A vacuum cleaner according to claim 1, and further comprising:
   (a) a mobile frame adapted to support said debris collection means and said blower means;
   (b) a handle connected to the rear of said mobile frame, said handle being alternately positionable in a vertical position or in a work position whereby said cleaner can be used as an upright vacuum; and
   (c) said air intake means comprising a beater bar mounted on the front of a platform supporting said tank means and a hose connecting said beater bar to said intake port.

3. A vacuum cleaner according to claim 1, wherein:
   (a) said spacing between said plates is substantially larger than the width of both of said first and second gaps whereby said serpentine airflow path varies therealong considerably in cross-sectional area.

4. A vacuum cleaner according to claim 3, wherein said insert further includes:
   (a) a plurality of support posts arranged about the center thereof and spaced radially and circumferentially from one another, said support posts supporting said annular plates in fixed position relative to each other; and
   (b) a top plate and a bottom plate, said support posts being connected between said top and said bottom plates.

5. A vacuum cleaner according to claim 4, wherein said insert further includes:
   (a) an axially aligned central riser tube with an outside diameter substantially smaller than the inside diameter of said central column such that a third gap exists between the inside of said central column and the outside of said central tube, said tube being shorter than the length of said tank such that there is a fourth gap between the bottom end of said tube and the bottom of said tank, said tube flow connecting with said output port at the top thereof; and
   (b) said central column includes at least one cutout about the top periphery thereof, said cutout, said third and said fourth gaps forming a flow path such that air exiting said serpentine path flows through said cutout, down said third gap, through said fourth gap, and up to the output port of the tank through said central tube.

6. A vacuum cleaner according to claim 5, wherein said insert further includes:
   (a) a filter removeably positioned within said central tube to filter out substantially all debris remaining from said airflow prior to said output port.

* * * * *